(12) United States Patent
Heinzelmann et al.

(10) Patent No.: US 11,811,037 B2
(45) Date of Patent: Nov. 7, 2023

(54) BATTERY-OPERATED WORKING APPARATUS HAVING A COOLING AIR GUIDE

(71) Applicant: Andreas Stihl AG & Co. KG, Waiblingen (DE)

(72) Inventors: Georg Heinzelmann, Winnenden (DE); Martin Failenschmid, Stuttgart (DE); Frederik Herrmann, Waiblingen (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 286 days.

(21) Appl. No.: 16/951,393

(22) Filed: Nov. 18, 2020

(65) Prior Publication Data
US 2021/0151814 A1 May 20, 2021

(30) Foreign Application Priority Data
Nov. 19, 2019 (EP) .................................... 19209944

(51) Int. Cl.
*H01M 10/6235* (2014.01)
*B25F 5/00* (2006.01)
*B25F 5/02* (2006.01)
*B27B 17/00* (2006.01)
*H02K 9/06* (2006.01)

(52) U.S. Cl.
CPC ......... *H01M 10/6235* (2015.04); *B25F 5/008* (2013.01); *B25F 5/02* (2013.01); *B27B 17/00* (2013.01); *H02K 9/06* (2013.01)

(58) Field of Classification Search
CPC .................................................... B25F 5/008
See application file for complete search history.

(56) References Cited

U.S. PATENT DOCUMENTS

| 8,757,288 B2 * | 6/2014 | Heinzelmann | B25F 5/02 |
| | | | 173/217 |
| 9,132,542 B2 * | 9/2015 | Lau | B25F 5/008 |
| 2006/0222930 A1 * | 10/2006 | Aradachi | H02J 7/00309 |
| | | | 429/96 |

(Continued)

FOREIGN PATENT DOCUMENTS

| CN | 205993049 U | 3/2017 |
| DE | 10 2009 015 422 A1 | 10/2009 |

(Continued)

OTHER PUBLICATIONS

Cover page of EP 2 747 949 A1 published Jul. 2, 2014 (one (1) page).

*Primary Examiner* — Nathaniel C Chukwurah
*Assistant Examiner* — Lucas E. A. Palmer
(74) *Attorney, Agent, or Firm* — Crowell & Moring LLP

(57) ABSTRACT

A hand-guided, battery-operated working apparatus has an apparatus housing in which is arranged an electric drive motor, a battery tray to accommodate a removable battery pack, and a cooling air guide. The cooling air guide includes an inlet-side air guide portion, which extends from a housing inlet into the battery tray as far as an air outlet from the battery tray, and an outlet-side air guide portion, which leads from the air outlet of the battery tray to the drive motor and, from there, onwards to a housing outlet. The working apparatus has a filter element, which is arranged in the cooling air guide so as to be accessible via the battery tray.

27 Claims, 3 Drawing Sheets

(56) References Cited

U.S. PATENT DOCUMENTS

| | | | | |
|---|---|---|---|---|
| 2015/0263592 | A1* | 9/2015 | Kawakami | B25F 5/008 |
| | | | | 451/359 |
| 2018/0131058 | A1* | 5/2018 | Wang | H01M 10/6235 |
| 2019/0262753 | A1* | 8/2019 | Miura | B25F 5/008 |
| 2020/0406415 | A1* | 12/2020 | Shimizu | A01D 34/416 |

FOREIGN PATENT DOCUMENTS

| | | | | |
|---|---|---|---|---|
| EP | 2 431 134 A2 | 3/2012 | | |
| EP | 2 535 149 A2 | 12/2012 | | |
| EP | 3778132 A1 * | 2/2021 | ......... | B01D 46/0005 |
| EP | 3778133 A1 * | 2/2021 | ......... | B01D 46/0004 |
| JP | 2016-7680 A | 1/2016 | | |
| JP | 6252778 B2 | 12/2017 | | |
| WO | WO 2013/032372 A1 | 3/2013 | | |

* cited by examiner

BATTERY-OPERATED WORKING APPARATUS HAVING A COOLING AIR GUIDE

CROSS REFERENCE TO RELATED APPLICATION

This application claims priority under 35 U.S.C. § 119 from European Patent Application No. 19209944.8, filed Nov. 19, 2019, the entire disclosure of which is herein expressly incorporated by reference.

BACKGROUND AND SUMMARY OF THE INVENTION

The invention relates to a hand-guided, battery-operated working apparatus, which comprises an apparatus housing, an electric drive motor in the apparatus housing, a battery tray in the apparatus housing to accommodate a removable battery pack, and a cooling air guide in the apparatus housing. The cooling air guide comprises an inlet-side air guide portion, which extends from a housing inlet into the battery tray as far as an air outlet from the battery tray, and an outlet-side air guide portion, which leads from the air outlet of the battery tray to the drive motor and, from there, onwards to a housing outlet. The battery pack serves to supply power to the drive motor, and the drive motor can be cooled by cooling air which is guided through the cooling air guide. As an option, it is also possible for the battery pack to be cooled by the cooling air.

Laid-open publication EP 2 431 134 A2 discloses a working apparatus of this kind in the form of a power saw, which has a fan impeller, secured on a motor shaft of the drive motor, for drawing in a cooling air flow, which is used to cool the drive motor and an electronic control system. During insertion, the battery pack is guided on mutually facing wall sides by guide webs, wherein a gap remains between the walls and the battery pack, and therefore cooling of the battery pack is also provided by suitable air guidance of the cooling air flow.

Utility Model publication CN 205993049 U discloses another working apparatus of this kind in the form of a power saw, in which the cooling air guide contains a fan arranged at the air outlet from the battery tray, downstream of the drive motor.

Laid-open publication US 2018/0131058 A1 discloses a battery-operated working apparatus in the form of a hand-held angle grinder or of a hand-held power drill, in which the battery pack can be coupled to one end of an apparatus housing, for which purpose it can be pushed on in a direction substantially parallel to said end, and the cooling air guide comprises a first and a second air guide path, which extend in parallel in terms of flow in an inlet-side portion and are brought together in an outlet-side portion and lead to a common air outlet on the housing. On the inlet side, the first air guide path opens via an air inlet on the battery-pack side into the coupled battery pack, leads through the latter and opens via an air outlet on the battery-pack side into an associated adjoining air guide portion. The second air guide path opens via a housing-side air inlet into the housing and, up to the point of combination, extends in parallel in terms of flow to the air guide portion of the first air guide path. At least one of the two guide air paths is routed via an electronic component and a drive motor, wherein a fan is arranged downstream of the drive motor.

Patent publication JP 6252778 B2 discloses a battery-operated angle grinder having an elongate cylindrical apparatus housing, an electric drive motor in the apparatus housing, a battery pack that can be coupled to the apparatus housing, and a cooling air guide in the apparatus housing. The apparatus housing has the grinding apparatus at a first end and has a fastening means for the releasable attachment of the battery pack on the other end. Adjacent to this fastening means, the cooling air guide has a lateral housing inlet into the apparatus housing, on which inlet a filter element can be positioned, it being possible for this purpose to fit said filter element removably into a receptacle on the apparatus housing. The battery pack coupled to the apparatus housing secures the filter element from movement out of its filter receptacle, i.e. the battery pack must first of all be removed from the apparatus housing to attach and remove the filter element. More specifically, the filter element in this arrangement can be inserted into its receptacle and removed therefrom parallel to a longitudinal axis of the apparatus housing, while the battery pack is pushed onto the associated end of the apparatus housing and removed from said end again perpendicularly to the longitudinal axis of the apparatus housing.

It is an object of the invention to provide a hand-guided, battery-operated working apparatus of the type stated at the outset which is further improved over the abovementioned prior art, particularly in respect of the cooling air guide.

The invention achieves this and other objects by providing a hand-guided, battery-operated working apparatus having the features mentioned at the outset and further comprising a filter element which is arranged in the cooling air guide in such a way as to be accessible via the battery tray. Advantageous developments of the invention are given in the dependent claims, the wording of which is hereby incorporated by reference into the description.

In the working apparatus according to the invention, the measures of accommodating the battery pack in the battery tray in the apparatus housing and of introducing cooling air into the battery tray and of guiding it onwards from there in the apparatus housing are advantageously combined with the measure of arranging the filter element in the cooling air guide in such a way as to be accessible via the battery tray and of enabling filtration by said element of cooling air guided in the cooling air guide. The positioning of the filter element in such a way that it is accessible via the battery tray has the advantage that, on the one hand, the filter element is accessible, e.g. for cleaning purposes, when the battery pack is not in the battery tray and, on the other hand, the battery pack protects or shields the filter element from damaging external influences when said pack has been inserted into the battery tray. In this way, the filter element can be positioned in the apparatus housing without problems at a location which is not visible during the operation of the working apparatus with the battery pack inserted into the battery tray, and can therefore be designed independently of desired requirements on the external design of the housing.

In this case, in advantageous embodiments of the invention, the inlet-side air guide portion of the cooling air guide, after its housing inlet into the battery tray, extends completely, or at least with one of several parallel air guide paths, in a part of the battery tray which is free from the battery pack, i.e. in a region of the battery tray which is not occupied by the battery pack when the battery pack has been inserted into the battery tray. The cooling air guided in this region between the battery pack and a peripheral boundary of the battery tray then flows past the battery pack or along one or more outer walls of the battery pack and not through the battery pack. As a result, the battery pack inserted into the battery tray can be adequately cooled without the absolute necessity of passing cooling air through the battery pack.

In advantageous embodiments of the invention, the apparatus housing is selectively sealed in such a way that cooling air guided in the cooling air guide enters the apparatus housing substantially only at the housing inlet into the battery tray. By means of such sealing of the housing, it is consequently possible to provide defined guidance of the cooling air by the cooling air guide designed for this purpose, wherein the cooling air passes into the battery tray at the housing inlet, from there to the air outlet from the battery tray and then to the drive motor and onwards to the fan outlet without this selective guidance of the cooling air flow being disrupted by a discernible quantity of extraneous air entering the apparatus housing at some other location.

In a development of the invention, the filter element is arranged at the air outlet of the battery tray or in the interior of the battery tray, ahead of the air outlet of the battery tray in the air flow direction. With this positioning, the filter element is directly accessible via the battery tray and, as a result, can be removed from the battery tray by the user via said tray, provided that the battery pack has first been removed from the battery tray. If the filter element is positioned at the air outlet of the battery tray, the battery tray can furthermore be configured according to the requirements on the battery pack, independently of the presence of the filter element. As an alternative, for corresponding uses, positioning of the filter element in the interior of the battery tray, ahead of the air outlet of the battery tray in the air flow direction, may be advantageous, e.g. in the form of a filter ring which is located between the housing inlet of the cooling air guide into the battery tray and the air outlet in terms of flow and through which the battery pack can be inserted when it is pushed into the battery tray.

In a development of the invention, the filter element is arranged in the apparatus housing, i.e. in the interior of the apparatus housing, and/or on a side wall of the battery tray facing the drive motor. By virtue of the positioning in the apparatus housing, the filter element is protected from external influences by the apparatus housing. If the filter element is positioned on a side wall of the battery tray facing the drive motor, the filter element is easily accessible via the battery tray, and the cooling air can be guided to the drive motor from the filter element over a relatively short path.

In a development of the invention, the filter element can be removed via the battery tray. By means of this measure, the filter element can be removed in a simple manner via the battery tray by the user when required, e.g. for cleaning purposes or for the purpose of replacement by a new filter element, and can also be reinserted in a reversal of this dismounting process.

In a development of the invention, the housing inlet and the housing outlet of the cooling air guide are situated on substantially opposite sides of the apparatus housing. This measure has advantages in respect of the cooling air. Thus, it is thereby possible to prevent heated cooling air that is emerging from the housing outlet from immediately being sucked back into the apparatus housing at the housing inlet. Moreover, the housing inlet can be arranged at a location of the apparatus housing which is uncritical in respect of dirt contamination so as to avoid the cooling air sucked into the apparatus housing from being undesirably laden with dirt.

In a development of the invention, a heat sink structure of an electronic component accommodated in the apparatus housing is arranged in the outlet-side air guide portion. As a result, the cooling air flow guided through the cooling air guide can also be used to cool the electronic component.

In a development of the invention, the cooling air guide comprises a fan arranged downstream of the drive motor. For corresponding uses, this measure offers advantages in respect of the fan arrangement and the air flow guide. By virtue of the positioning of the fan downstream of the drive motor, the drive motor is situated in the suction zone of the fan, and the fan can be coupled with relatively little effort to the drive motor in terms of drive.

In one embodiment of the invention, the fan has a fan housing that widens in the form of a funnel towards a fan outlet, wherein the fan outlet forms the housing outlet of the cooling air guide. This represents an advantageous configuration of the guidance of the cooling air flow in the region of the fan. The cooling air flow guided by the cooling air guide emerges from the apparatus housing as an air flow that widens in the form of a funnel, thereby enabling the air flow to emerge at a relatively low speed and enabling noise generation to be kept low.

In a development of the invention, the battery tray is bounded, at least in a partial region on the tray inlet side, by a casing, which is mounted removably on the remainder of the apparatus housing. This measure has the advantage that, when required, the user can remove the casing and thus the battery tray as a whole or at least an inlet-side part thereof from the remainder of the apparatus housing, whereby accessibility to the filter element and, where applicable, further apparatus components arranged in the battery tray region can be facilitated, for example.

In a development of the invention, the casing has a closed circumference. In this case, accordingly, the battery tray as a whole or at least an inlet-side part is embodied with a closed circumference, which may have design advantages and/or advantages in respect of the cooling air guide in the battery tray region and/or in respect of the accommodation of the battery pack in the battery tray.

In a development of the invention, the working apparatus is implemented in accordance with an advantageous application as a hand-held, battery-operated power saw.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
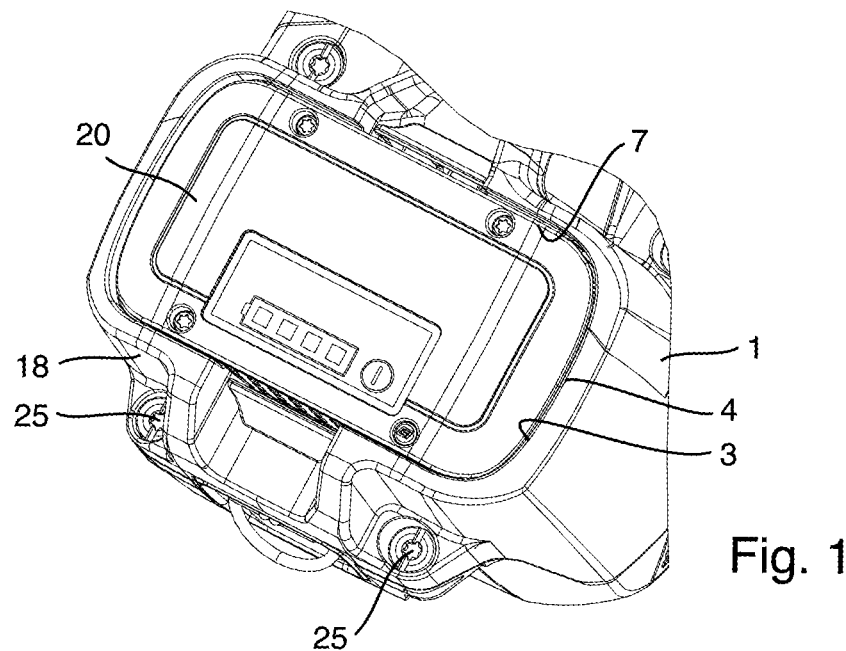
FIG. 1 shows a perspective view of a hand-guided, battery-operated working apparatus, looking at a housing region with a battery tray and a battery pack accommodated therein.
Figure 2:
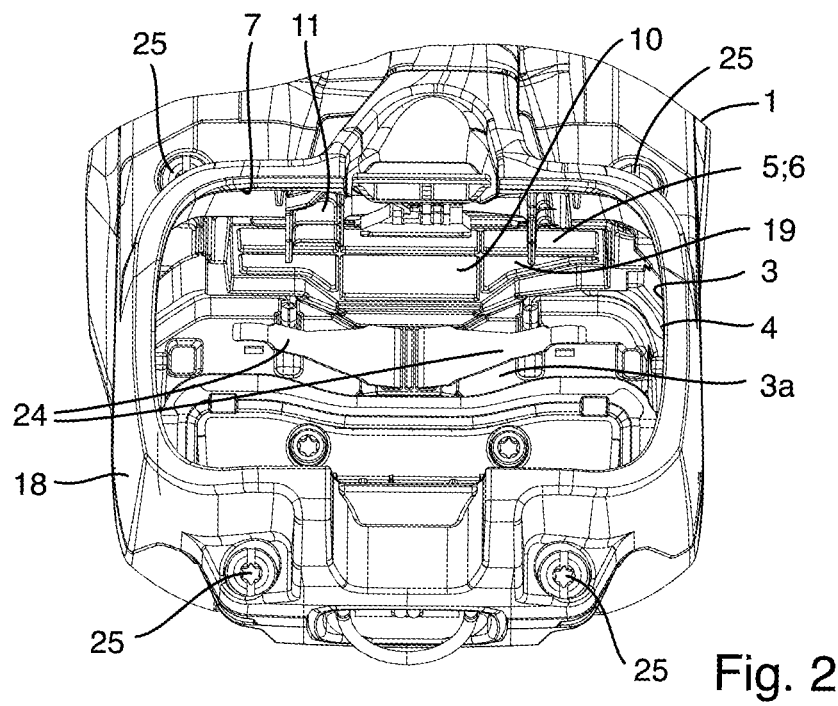
FIG. 2 shows a more detailed perspective view of the battery tray region without a battery pack inserted.
Figure 3:
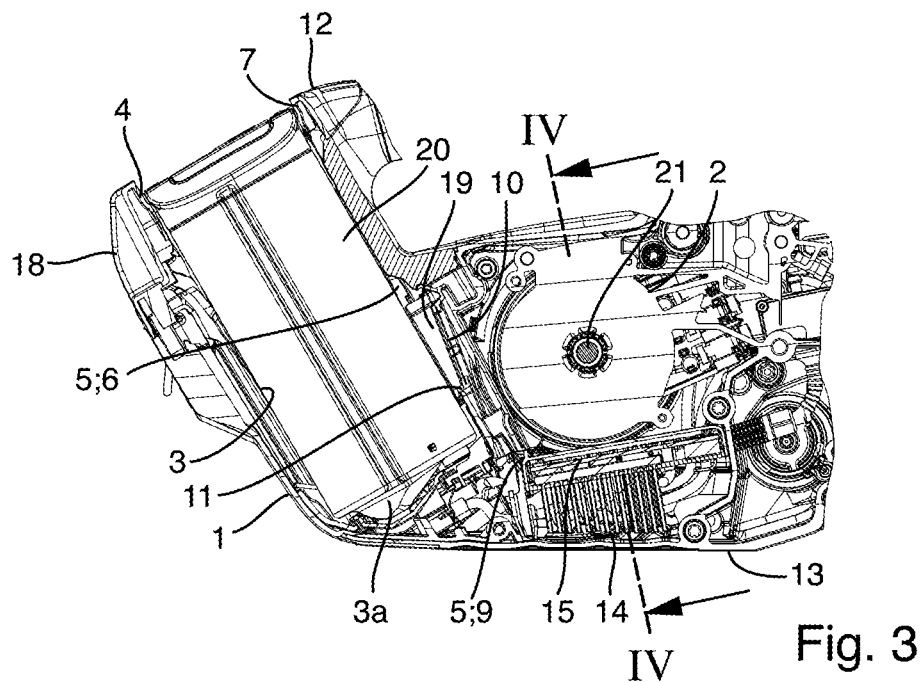
FIG. 3 shows a longitudinal section through the apparatus region of FIG. 1.

The working apparatus shown in FIGS. 1 to 5 comprises an apparatus housing 1, an electric drive motor 2 in the apparatus housing 1, a battery tray 3 in the apparatus housing 1 for accommodating a removable battery pack 20, a cooling air guide 5 in the apparatus housing 1, and a filter element 10, which is arranged in the cooling air guide 5 in such a way as to be accessible via the battery tray 3. The working apparatus shown can be configured, in particular, as a hand-held, battery-operated power saw. In alternative embodiments, the working apparatus according to the invention is embodied as some other hand-guided, battery-operated garden or forestry working apparatus, e.g. as a grass trimmer, lawnmower, angle grinder, power drill or the like.

The cooling air guide 5 comprises an inlet-side air guide portion 6 and an adjoining outlet-side air guide portion 9. The inlet-side air guide portion 6 extends from a housing inlet 7 into the battery tray 3 as far as an air outlet 19 from the battery tray 3. The outlet-side air guide portion 9 leads from the air outlet 19 of the battery tray 3 to the drive motor 2, thus enabling the drive motor 2 to be cooled by a cooling air flow guided by the cooling air guide 5. As an option, the battery pack 20 is also cooled by the cooling air flow. From the drive motor 2, the outlet-side air guide portion 9 leads onwards to a housing outlet 8.

The battery pack 20 can preferably be inserted into the battery tray 3 and removed therefrom via an associated tray opening 4. In this case, as in the example shown, the housing inlet 7 of the inlet-side air guide portion 6 into the battery tray 3 is preferably situated on the same side of the battery tray 3 as the tray opening 4. In a preferred implementation, the housing inlet 7 of the inlet-side air guide portion 6 into the battery tray 3 is formed by a part of the tray opening 4 that is not occupied by the inserted battery pack 20. As in the example shown, the battery tray 3 preferably extends from the tray opening 4 into the apparatus housing 1, i.e. into the interior of the apparatus housing 1 with a tray longitudinal direction, along which the insertion of the battery pack 20 takes place, that is not parallel to the associated side of the apparatus housing 1. In alternative embodiments, the battery tray 20 extends along one side of the apparatus housing 1.

In corresponding embodiments, an air space as part of the inlet-side guide portion 6 remains on at least one side between boundary walls of the battery tray 3 and the inserted battery pack 20. In the example shown, there is an air space of this kind on all four peripheral sides between the cuboidal battery pack 20 and the corresponding cavity formation of the battery tray 3, with the result that cooling air guided in the inlet-side air guide portion 6 flows around the battery pack 20 inserted into the battery tray 3 over the entire circumference of the housing inlet 7 as far as the air outlet 19 from the battery tray 3. An air space of this kind also remains on a bottom side 3a of the battery tray 3, wherein, in the example shown, there are arranged there spring tongues 24 which move the battery pack 20 inserted into the battery tray 3 and held there by means of a locking means by a certain distance out of the battery tray 3 after the locking means has been released, thereby facilitating the removal of the battery pack 20 from the battery tray 3.

The accessibility of the filter element 10 via the battery tray 3 means that the filter element 10 is accessible to a user when the battery pack 20 is not in the battery tray 3. This accessibility allows the user to clean the filter element 10 via the battery tray 3, for example. When the battery pack 20 has been inserted into the battery tray 3, it protects and conceals the filter element 10.

In advantageous embodiments, as in the example shown, the filter element 10 is arranged at the air outlet 19 of the battery tray 3. As a result, the entire interior of the battery tray 3 remains free from the filter element 10. In alternative embodiments, the filter element 10 is arranged in the interior of the battery tray 3 at a distance ahead of the air outlet 19 of the battery tray 3 in the air flow direction, i.e. upstream of the air outlet 19. This can be advantageous, for example, if the air outlet 19 of the battery tray 3 is not readily accessible via the battery tray 3 or if reasons associated with air flow suggest arranging the filter element 10 at a distance from the air outlet 19 in the battery tray 3. In particular, as shown, the filter element 10 can be embodied as a sheet-like, flat filter element which extends substantially in one plane.

In corresponding embodiments, the filter element 10 is arranged in the apparatus housing 1 on a side wall 11 of the battery tray 3 facing the drive motor 2, as in the example shown. In alternative embodiments, the filter element 10 is arranged on instead of in the apparatus housing 1 and/or it is arranged not on the side wall 11 of the battery tray 3 facing the drive motor 2 but on another side wall of the battery tray 3 and, in corresponding fashion, in or on the apparatus housing 1.

In advantageous embodiments, as in the example shown, the filter element 10 can be removed via the battery tray 3. In this case, the filter element 10 is not only accessible to the user via the battery tray 3 but can be removed by the user via the battery tray 3, e.g. to enable it to be cleaned outside the apparatus housing or to be replaced with a new filter element in the case of maintenance. For this purpose, the filter element 10 is preferably arranged releasably in the apparatus housing 1, preferably in the battery tray 3, or on the relevant side wall 11 of the battery tray 3, e.g. by means of a corresponding conventional clip, touch-and-close, latching or screwed joint. In corresponding fashion, the filter element 10 can then also once again be inserted and fixed at the location of use via the battery tray 3.

In advantageous embodiments, as in the example shown, the housing inlet 7 and the housing outlet 8 of the cooling air guide 5 are situated on substantially opposite sides 12, 13 of the apparatus housing. In the example shown, these two opposite apparatus housing sides 12, 13 are an upper and a lower housing side in a horizontal position of the working apparatus. The arrangement of the housing inlet 7 and of the housing outlet 8 of the cooling air guide 5 on two opposite apparatus housing sides prevents unwanted re-introduction of heated cooling air expelled from the housing outlet 8 into the housing inlet 7. In alternative embodiments, the housing inlet 7 and the housing outlet 8 of the cooling air guide 5 can be situated on the same apparatus housing side or on two adjacent, mutually adjoining sides of the apparatus housing 1. In either case, it is possible when required to ensure that the housing inlet 7 is situated as far as possible away from a potentially dust-laden region of the working apparatus. It is thus possible, for example, for the housing inlet 7 of the cooling air guide 5 to be arranged on an upper side of the apparatus housing 1 if the formation of any dirt primarily on an underside of the working apparatus is to be expected during the operation of the working apparatus.

In corresponding embodiments, as in the example shown, a heat sink structure 14 of an electronic component 15 accommodated in the apparatus housing 1 is arranged in the outlet-side air guide portion 9. This enables cooling of the electronic component 15 by the cooling air flow guided in the cooling air guide 5. It is possible, for example, for the heat sink structure 14 to comprise an arrangement of pin-type heat sinks, as shown, and/or of flat cooling fins etc. The electronic component 15 can comprise, for example, electronic components for an electronic control system of the drive motor 2 and/or, depending on the working apparatus, further electronically controllable components that are present. In the example shown, the heat sink structure 14 of the electronic component 15 is situated in the outlet-side air guide portion 9 of the cooling air guide 5, upstream of the drive motor 2. This can be seen in FIG. 4 from air flow arrows 23, which represent the cooling air flow and which illustrate the air flow profile in the outlet-side air guide portion 9 of the cooling air guide 5.

Figure 4:
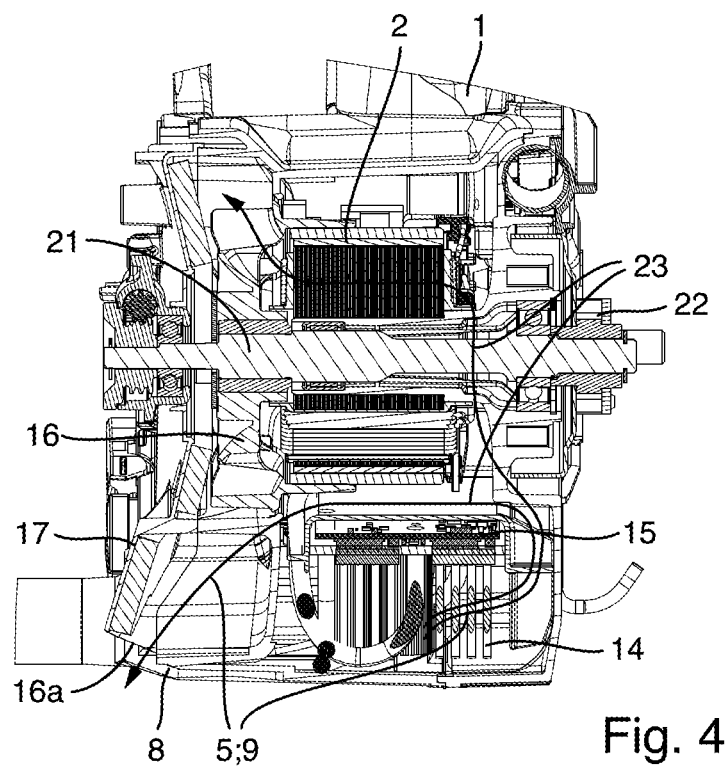
FIG. 4 shows a cross-sectional view along a line IV-IV in FIG. 3.
Figure 5:
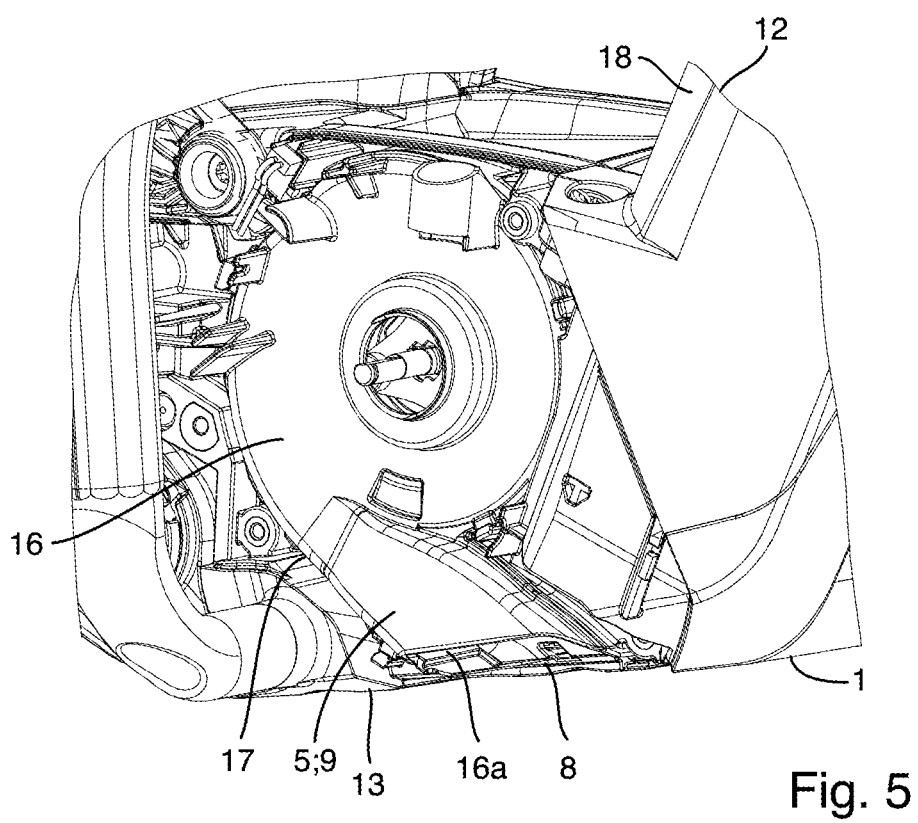
FIG. 5 shows a side view of a fan region of the apparatus without the outer housing shell.

In corresponding embodiments, as in the example shown, the cooling air guide 5 comprises a fan 16 arranged downstream of the drive motor 2. The fan 16 represents the active element for guiding the cooling air through the inlet-side and outlet-side air guide portion 6, 9. The fan 16 can preferably be driven by the drive motor 2 and, in corresponding implementations, as in the example shown, is seated on the same drive shaft 21 of the drive motor 2 as an implement, driven by the drive motor 2, of the working apparatus, e.g. a saw chain of a power saw. In this connection, FIG. 4 shows a chain wheel 22 for a saw chain of this kind, which is situated on the opposite side of the drive motor 2 from the fan 16.

By virtue of the arrangement of the fan 16 downstream of the drive motor 2, the entire inlet-side air guide portion 6 and the outlet-side air guide portion 9 up to the fan 16 are situated in the suction zone of the fan 16, i.e. the battery pack 20, the filter element 10 and the drive motor 2 as tray as the optional heat sink structure 14 of the electronic component 15 are situated in the cooling air suction flow generated by the fan 16. In alternative embodiments, the fan 16 is positioned at a location in the outlet-side air guide portion 9 which is situated upstream of the drive motor 2 or already in the inlet-side air guide portion 6.

In advantageous embodiments, as in the example shown, the fan 16 has a fan housing 17 which widens in the form of a funnel towards a fan outlet 16*a*, wherein the fan outlet 16*a* forms the housing outlet 8 of the cooling air guide 5. In alternative embodiments, the fan housing 17 has a different shape towards the fan outlet 16*a*, e.g. with a constant or decreasing air passage cross section, and/or the fan outlet 16*a* is situated at a location spaced apart upstream of the housing outlet 8 of the cooling air guide 5.

In corresponding embodiments, the battery tray 3 is bounded, at least in a partial region on the tray inlet side, by a casing 18, which is mounted removably on the remainder of the apparatus housing 1. In the example shown, the casing 18 is more specifically mounted removably on the remainder of the apparatus housing 1 by means of a screwed joint 25, preferably with the use of a plurality of associated screws, as shown. In corresponding cases, the removal of the casing 18 can facilitate the dismounting of the filter element 10 or additionally facilitate access thereto. In alternative embodiments, the battery tray 3 as a whole is formed by a part of the apparatus housing 1 connected non-detachably, i.e. in a manner which does not allow detachment without destruction, to the remainder of the apparatus housing 1, e.g. in an integral embodiment with an adjoining part of the apparatus housing 1.

In advantageous embodiments, the casing 18 has a closed circumference, as in the example shown. As a result, the casing 18 can serve on all sides as an outer boundary for the inlet-side air guide portion 6, wherein, in this case, the housing inlet 7 of the inlet-side air guide portion 6 into the battery tray 3 is preferably situated at an open end of the casing 18, wherein the open end of the casing 18 provides the tray opening 4 via which the battery pack 20 can be inserted into the battery tray 3.

As the exemplary embodiments shown and other exemplary embodiments explained above make clear, the invention makes available a hand-guided, battery-operated working apparatus with advantageous characteristics, especially as regards the cooling air guide and the arrangement of a filter element in the cooling air guide. The specific cooling air guide allows effective cooling for the battery pack and the drive motor and optionally of further apparatus components to be cooled, such as electronic components. If required, the cooling air can be supplied in a region of the working apparatus which is uncritical in respect of the incidence of dirt. The apparatus housing is preferably embodied in a suitably sealed manner in order to ensure the defined cooling air guidance. The filter element is arranged in the cooling air guide in such a way that it is accessible for cleaning purposes, for example, via the battery tray and is protected.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-guided, battery-operated working apparatus, comprising:
   an apparatus housing;
   an electric drive motor in the apparatus housing;
   a battery tray in the apparatus housing to accommodate a removable battery pack;
   a cooling air guide in the apparatus housing, which guide comprises an inlet-side air guide portion, which extends from a housing inlet into the battery tray as far as an air outlet from the battery tray, and an outlet-side air guide portion, which leads from the air outlet of the battery tray to the drive motor and, from there, onwards to a housing outlet; and
   a filter element, which is arranged in the cooling air guide so as to be accessible via the battery tray,
   wherein the filter element is arranged in the interior of the battery tray, ahead of the air outlet of the battery tray in the air flow direction.

2. The hand-guided, battery-operated working apparatus according to claim 1, wherein the filter element is arranged in the apparatus housing.

3. The hand-guided, battery-operated working apparatus according to claim 1, wherein the filter element is capable of being removed via the battery tray.

4. The hand-guided, battery-operated working apparatus according to claim 1, wherein the housing inlet and the housing outlet of the cooling air guide are situated on substantially opposite sides of the apparatus housing.

5. The hand-guided, battery-operated working apparatus according to claim 1, wherein the hand-guided, battery-operated working apparatus is configured as a hand-held, battery-operated power saw.

6. A hand-guided, battery-operated working apparatus, comprising:
   an apparatus housing;
   an electric drive motor in the apparatus housing;
   a battery tray in the apparatus housing to accommodate a removable battery pack;
   a cooling air guide in the apparatus housing, which guide comprises an inlet-side air guide portion, which extends from a housing inlet into the battery tray as far as an air outlet from the battery tray, and an outlet-side air guide portion, which leads from the air outlet of the battery tray to the drive motor and, from there, onwards to a housing outlet; and a filter element, which is arranged in the cooling air guide so as to be accessible via the battery tray,
wherein the filter element is arranged on a side wall of the battery tray facing the drive motor such that an air outlet face of the filter element faces the drive motor.

7. The hand-guided, battery-operated working apparatus according to claim 6, wherein the filter element is arranged at the air outlet of the battery tray.

8. The hand-guided, battery-operated working apparatus according to claim 6, wherein the filter element is capable of being removed via the battery tray.

9. The hand-guided, battery-operated working apparatus according to claim 6, wherein the housing inlet and the housing outlet of the cooling air guide are situated on substantially opposite sides of the apparatus housing.

10. The hand-guided, battery-operated working apparatus according to claim 6, wherein the hand-guided, battery-operated working apparatus is configured as a hand-held, battery-operated power saw.

11. The hand-guided, battery-operated working apparatus according to claim 6, wherein the filter element is arranged in the apparatus housing.

12. A hand-guided, battery-operated working apparatus, comprising:
an apparatus housing;
an electric drive motor in the apparatus housing;
a battery tray in the apparatus housing to accommodate a removable battery pack;
a cooling air guide in the apparatus housing, which guide comprises an inlet-side air guide portion, which extends from a housing inlet into the battery tray as far as an air outlet from the battery tray, and an outlet-side air guide portion, which leads from the air outlet of the battery tray to the drive motor and, from there, onwards to a housing outlet; and
a filter element, which is arranged in the cooling air guide so as to be accessible via the battery tray,
wherein a heat sink structure of an electronic component is arranged in the outlet-side air guide portion, said heat sink structure being accommodated in the apparatus housing below the drive motor.

13. The hand-guided, battery-operated working apparatus according to claim 12, wherein the filter element is arranged at the air outlet of the battery tray.

14. The hand-guided, battery-operated working apparatus according to claim 12, wherein the filter element is capable of being removed via the battery tray.

15. The hand-guided, battery-operated working apparatus according to claim 12, wherein the hand-guided, battery-operated working apparatus is configured as a hand-held, battery-operated power saw.

16. The hand-guided, battery-operated working apparatus according to claim 12, wherein the filter element is arranged in the apparatus housing.

17. A hand-guided, battery-operated working apparatus, comprising:
an apparatus housing;
an electric drive motor in the apparatus housing;
a battery tray in the apparatus housing to accommodate a removable battery pack;
a cooling air guide in the apparatus housing, which guide comprises an inlet-side air guide portion, which extends from a housing inlet into the battery tray as far as an air outlet from the battery tray, and an outlet-side air guide portion, which leads from the air outlet of the battery tray to the drive motor and, from there, onwards to a housing outlet; and
a filter element, which is arranged in the cooling air guide so as to be accessible via the battery tray,
wherein the cooling air guide comprises a fan arranged downstream of the drive motor, and
wherein the fan has a fan housing that widens in the form of a funnel towards a fan outlet, and the fan outlet forms the housing outlet of the cooling air guide, the housing outlet being provided in a bottom side of the apparatus housing.

18. The hand-guided, battery-operated working apparatus according to claim 17, wherein the filter element is arranged at the air outlet of the battery tray.

19. The hand-guided, battery-operated working apparatus according to claim 17, wherein the filter element is capable of being removed via the battery tray.

20. The hand-guided, battery-operated working apparatus according to claim 17, wherein the hand-guided, battery-operated working apparatus is configured as a hand-held, battery-operated power saw.

21. The hand-guided, battery-operated working apparatus according to claim 17, wherein the filter element is arranged in the apparatus housing.

22. A hand-guided, battery-operated working apparatus, comprising:
an apparatus housing;
an electric drive motor in the apparatus housing;
a battery tray in the apparatus housing to accommodate a removable battery pack;
a cooling air guide in the apparatus housing, which guide comprises an inlet-side air guide portion, which extends from a housing inlet into the battery tray as far as an air outlet from the battery tray, and an outlet-side air guide portion, which leads from the air outlet of the battery tray to the drive motor and, from there, onwards to a housing outlet; and
a filter element, which is arranged in the cooling air guide so as to be accessible via the battery tray,
wherein the battery tray is bounded at its side surfaces, at least in a partial region on a tray inlet side, by a closed circumference of a casing, which is mounted removably on a remainder of the apparatus housing.

23. The hand-guided, battery-operated working apparatus according to claim 22, wherein the filter element is arranged at the air outlet of the battery tray.

24. The hand-guided, battery-operated working apparatus according to claim 22, wherein the filter element is capable of being removed via the battery tray.

25. The hand-guided, battery-operated working apparatus according to claim 22, wherein the housing inlet and the housing outlet of the cooling air guide are situated on substantially opposite sides of the apparatus housing.

26. The hand-guided, battery-operated working apparatus according to claim 22, wherein the hand-guided, battery-operated working apparatus is configured as a hand-held, battery-operated power saw.

27. The hand-guided, battery-operated working apparatus according to claim 22, wherein the filter element is arranged in the apparatus housing.

* * * * *